United States Patent [19]

Yagii et al.

[11] Patent Number: 5,138,015

[45] Date of Patent: Aug. 11, 1992

[54] PROCESS FOR PRODUCING POLYURETHANE

[75] Inventors: Toyokazu Yagii; Toshihide Maruyama, both of Hiroshima; Kiyokazu Murata, Hyogo, all of Japan

[73] Assignee: Daicel Chemical Industries, Ltd., Sakai, Japan

[21] Appl. No.: 752,481

[22] PCT Filed: Mar. 19, 1991

[86] PCT No.: PCT/JP91/00369

§ 371 Date: Sep. 6, 1991

§ 102(e) Date: Sep. 6, 1991

[87] PCT Pub. No.: WO91/14725

PCT Pub. Date: Oct. 3, 1991

[30] Foreign Application Priority Data

| Mar. 19, 1990 | [JP] | Japan | 2-68643 |
| Mar. 26, 1990 | [JP] | Japan | 2-76098 |
| Apr. 2, 1990 | [JP] | Japan | 2-88046 |
| Feb. 1, 1991 | [JP] | Japan | 2-99876 |

[51] Int. Cl.$^5$ ............................................. C08G 18/08
[52] U.S. Cl. .............................. 528/44; 252/182.2; 528/48; 528/370; 528/371
[58] Field of Search ............... 528/44, 48, 370, 371; 252/182.2

*Primary Examiner*—Maurice J. Welsh
*Attorney, Agent, or Firm*—Flynn, Thiel, Boutell & Tanis

[57] ABSTRACT

A process for producing polyurethane useful as coating material, which comprises preparing dialkyl carbonate, substantially without using phosgene, reacting the carbonate with a diamine to give a urethane, thermally decomposing the urethane into a diisocyanate, and converting the diisocyanate into a polyurethane in the presence of a Lewis acid and/or a protonic acid. The reaction of a diisocyanate compound containing a reduced amount of chlorine is promoted by a Lewis acid and/or a protonic acid.

7 Claims, No Drawings

PROCESS FOR PRODUCING POLYURETHANE

TECHNICAL FIELD

A polyurethane useful as a coating material can be produced by preparing a dialkyl carbonate substantially without using phosgene, reacting the carbonate with a diamine to give a urethane, thermally decomposing the urethane into a diisocyanate and reacting the diisocyanate with a polyol or the like in the presence of a Lewis acid or a protonic acid. The reaction of a diisocyanate compound containing a reduced amount of chlorine is promoted by a Lewis acid or a protonic acid.

A diisocyanate compound containing a reduced amount of chlorine is reacted with a polyol, amine or the like to give a polyurethane resin which is industrially useful as a coating material, heat insulator, cushioning material, mechanical part or the like and can be widely utilized in many necessities for daily life for example, automobile parts, domestic electrical appliances, business machines, clothing, household furnitures and so on.

BACKGROUND ART

A polyurethane is used by virtue of its excellent characteristics as a coating material in the form of a composition suitably prepared by mixing it with other components or reacting it with other compounds.

Examples of such a coating material include (1) curable coating materials for optical fibers, large cathode ray tubes or cosmetic containers comprising a urethane (meth)acrylate resin which is prepared by the reaction of a urethane with a hydroxylated (meth)acrylate and is curable by irradiation with ultraviolet rays or electron beams, (2) coating materials of cathodic electrodeposition type which are prepared by the reaction of a urethane with a polyester modified epoxy resin, epoxidized polybutadiene resin or glycidylated acrylic resin and are useful as an undercoat for an automobile body, building skeleton or aluminum sash, (3) polyurethane coating materials for molded articles of thermoplastics, such as an automobile bumper or a wheel cap or wood works such as furniture, door or wooden parts of office facilities, (4) one pack baking urethane coating materials for metals which are applicable to outer cases of electrical appliances (such as a refrigerator, audio and VCR), metallic automobile parts, blind and roofing and wall covering materials, (5) two pack acrylic urethane or polyester urethane coating materials which comprise a polyisocyanate compound prepared by converting an isocyanate into an isocyanurate, biuret or allophanate or an isocyanate adduct prepared by the addition reaction of an isocyanate with a low molecular diol or triol and a hydroxylated acrylic resin or a polyester resin and which are usable in the repair of automobiles or are applicable to automobile parts and wood works, and (6) urethane powder coatings applicable to outer cases of domestic electrical appliances such as a washing machine or office facilities, and anticorrosive coatings containing a urethane prepolymer useful as an intercoating of a bridge, steel frame or automobile body.

These urethane coating materials are generally prepared by the polyaddition of a polyisocyanate compound with a polyol such as polyether polyol, polyester polyol or low-molecular polyhydric alcohol and, if necessary, by the use of an active hydrogen compound as a chain lengthening agent.

Most of the polyisocyanates to be used in the above polyaddition are directly prepared industrially by the reaction of a polyamine with phosgene, excepting ones having a special structure.

In other words, according to the prior art, at least one of the starting materials to be used in the production of a polyurethane is prepared by the use of toxic phosgene in some preparation step.

In the field of various coating materials described above, the resistances of polyurethane which is one of the main components of the coating materials to weather, corrosion and heat are important factors, so that the development of a polyurethane improved in these characteristics has been expected.

In the case as described above wherein at least one of the starting materials is prepared by the use of toxic phosgene in some preparation step, a polyurethane prepared from the resulting starting materials is inevitably contaminated with chlorine compounds.

The contamination of a polyurethane with chlorine compounds affects the above characteristics, particularly weatherability and corrosion resistance.

A diisocyanate compound directly prepared by the reaction of a polyamine with phosgene generally contains various chlorine compounds such as unreacted phosgene, chloroformate as a by product of the reaction and/or mono- or di-carbamoyl chloride as an intermediate thereof in a concentration of several hundreds of ppm.

Further, these chlorine compounds cannot be removed by any economical process.

Meanwhile, a diisocyanate compound prepared by thermally decomposing a urethane compound prepared by the reaction of a dialkyl carbonate prepared by the use of phosgene with a diamine also contains various chlorine compounds in a concentration of several tens of ppm, though the concentration is lower than that of the diisocyanate prepared by the above phosgene process.

Accordingly, the resistances of a polyurethane to weather and corrosion are fairly improved by the use of this diisocyanate compound, but the improvement is not enough.

Most isocyanate compounds excepting ones having a special structure are prepared directly by the reaction of an amine with phosgene Among these isocyanate compounds, a diisocyanate compound is reacted with a compound having an active hydrogen such as one having a hydroxyl or amino group to give a polyurethane resin which is very useful in industrial fields as a coating material, thermal insulator, cushioning material, mechanical part or the like and is widely utilized in many necessities for daily life, for example, automobile parts, domestic electrical appliances, business machines, clothing, household furniture and so on.

The following reaction mechanism is described in the Journal of Paint Technology, Vol. 43, No. 562 (1971) as a mechanism of the conversion of isocyanate into urethane in the preparation of a polyurethane resin described above:

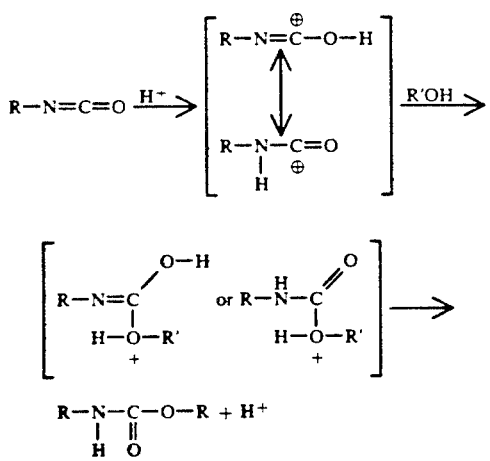

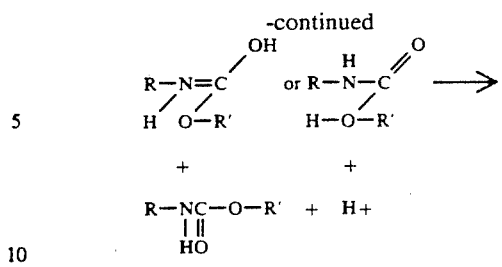

Namely, it is presumed that the proton present in the reaction system catalyze the electrophilic attack of the carbonyl group of the isocyanate on a hydroxyl group.

To investigate conventional diisocyanates and processes for the preparation thereof, as described above, most of the conventional diisocyanates are prepared directly by the reaction of an amine with phosgene, so that they contain not only a slight amount of unreacted phosgene but also compounds having a functional group such as a carbamoyl or carboxyl group and hydrogen chloride as impurities.

The content of such impurities in a conventional diisocyanate ranges from 100 to 1000 ppm in terms of chlorine.

Accordingly, it is presumed that the proton eliminated from these impurities catalyzes the conversion of isocyanate into urethane.

However, the content of chlorine compounds in a diisocyanate prepared from a dialkyl carbonate and a diamine is estimated to be as follows. That is, the content of chlorine compounds in a diisocyanate prepared from a dialkyl carbonate prepared through phosgene and a diamine is 5 to 50 ppm in terms of chlorine, while that in a diisocyanate prepared from a dialkyl carbonate prepared without using phosgene and a diamine through a urethane compound is 1 ppm or below. A diisocyanate compound containing such a small amount of chlorine compounds is low in reactivity in its conversion into urethane.

Eager studies have been made in order to enhance the reactivity of such a diisocyanate compound which would be equivalent to or superior to that of a conventional diisocyanate compound directly prepared from phosgene and a diamine and containing about 100 to 1,000 ppm of chlorine compounds.

The mechanism of the conversion of isocyanate into urethane in the preparation of a polyurethane resin is reported in ACS, Symposium, Ser., 270, 111 (1985).

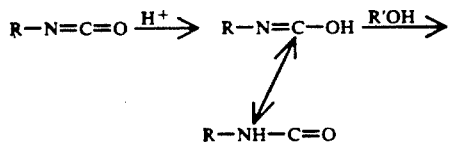

However, a diisocyanate compound prepared from dimethyl carbonate prepared substantially without using phosgene and a diamine through a urethane compound contains impurities different from those contained in a diisocyanate compound prepared by a conventional process, because the former diisocyanate compound is prepared through a reaction route different from that of the latter one.

More specifically, the former diisocyanate contains neither a slight amount of unreacted phosgene nor compounds having a functional group such as carbamoyl or carboxyl group nor hydrogen chloride.

Accordingly, it is impossible to expect the effect of the proton in promoting the formation of a urethane compound shown in chemical formula 1.

DISCLOSURE OF INVENTION

The present invention provides a method of enhancing the reactivity of a diisocyanate compound and a composition comprising a diisocyanate compound which is improved in reactivity as a main component.

The inventors of the present invention have made intensive studies to enhance the reactivity of a diisocyanate compound prepared from dimethyl carbonate prepared substantially without using phosgene and a diamine through a urethane compound in the production of a polyurethane therefrom which is equivalent or superior to that of a conventional diisocyanate compound.

As a result of the studies, the inventors of the present invention have found that surprisingly the conversion of a diisocyanate compound prepared from dimethyl carbonate and a diamine through a urethane compound into polyurethane is activated remarkably by the addition of a protonic or Lewis acid which is lowly reactive to an isocyanate group and that the obtained polyurethane contains neither phosgene nor any compound having a functional group such as carbamoyl or carboxyl group nor hydrogen chloride, so that it is further improved in weather ability, corrosion resistance and heat resistance and therefore is suitably usable in the preparation of coating materials, adhesives and molded articles. The present invention has been accomplished on the basis of these findings.

The present invention relates to a process for producing polyurethane which comprises preparing a dialkyl carbonate substantially without using phosgene, preparing a diisocyanate by the reaction of the carbonate with a diamine through a urethane compound and converting the diisocyanate into a polyurethane in the presence of a Lewis acid or a protonic acid.

It is preferable that the diisocyanate contain chlorine compounds in an amount of 10 ppm or below in terms of chlorine. The dialkyl carbonate is prepared mainly by one of the following processes: (1) a process for preparing it from carbon monoxide, oxygen and an alkanol, (2) a process comprising preparing propylene carbonate from propylene oxide and carbon dioxide and reacting the carbonate with an alkanol, and (3) a process for preparing it from an alkyl nitrite and carbon monoxide.

The present invention includes also a reaction composition which comprises a diisocyanate and a protonic acid and/or a Lewis acid and a coating composition comprising a polyurethane produced above and a pigment.

The diisocyanate compound to be used in the present invention is one prepared by reacting a dialkyl carbonate such as by dimethyl carbonate which has been prepared without using phosgene with a diamine to give a urethane compound and converting the urethane compound into an isocyanate compound.

The term "without using phosgene" frequently used in this description means that no phosgene is used even in the preparation of a dialkyl carbonate which is one of the starting materials.

For example, processes for producing polyurethane wherein phosgene is used in the step of preparing a dialkyl carbonate (disclosed in Japanese Patent Publication No. 853500/1987 and Japanese Patent KOKAI Nos. 197639/1985 and 118349/1986), of course, do not fall within the scope of the present invention.

On the other hand, since the isocyanate compound to be used in the present invention is one which is prepared without using phosgene in any preparation step and therefore is substantially free from chlorine compounds resulting from phosgene, the characteristics of the polyurethane produced therefrom are hardly affected adversely by chlorine compounds, thus serving to attain the objects of the present invention.

Although a dialkyl carbonate was formerly prepared by the use of phosgene as the starting material as described above, a process for preparing it by using carbon monoxide as the starting material is also practically employed and techniques for carrying out the process industrially are being established It is an essential requirement of the present invention to use a dialkyl carbonate prepared without using phosgene in order to prevent the contamination of polyurethane with chlorine. The processes for preparing a dialkyl carbonate without using phosgene are disclosed in, for example, Japanese Patent KOKAI Nos. 57522/1988, 72650/1988, 72651/1988 and 287062/1989, Japanese Patent Publication Nos. 58739/1985, 8020/1981, 23662/1985, 8816/1986, 43338/1986, 38018/1988, 8113/1887 and 26977/1986 and Japanese Patent KOKAI Nos. 94943/1985, 11443/1985 and 181051/1985.

Further, a process for preparing dimethyl carbonate which comprises preparing an alkylene carbonate from an alkylene oxide and carbon dioxide and reacting the carbonate with methanol is known as another process for preparing a dialkyl carbonate without using phosgene.

Processes for preparing an alkylene carbonate from an alkylene oxide and carbon dioxide are disclosed in, for example, Japanese Patent Publication No. 27314/1973 and Japanese Patent KOKAI Nos. 13720/1976, 19722/1976, 19723/1976, 118763/1976 and 128382/1984.

Further, processes for preparing a dialkyl carbonate from an alkylene carbonate and an alcohol are disclosed in, for example, Japanese Patent Publication Nos. 22697/1985, 22698/1985, 4381/1986, 40708/1981, 16267/1986, 27658/1985 and 28542/1984 and Japanese Patent Application Nos. 178347/1989 and 178348/1989.

Of course, dialkyl carbonates prepared by these processes may be also used in the present invention.

The process disclosed in the Japanese Patent KOKAI No. 287062/1989 will now be described as a representative process for preparing a dialkyl carbonate without using phosgene.

According to this process, carbon monoxide, an alcohol and oxygen are used as the starting materials and are reacted in the presence of a catalyst under a normal or elevated pressure.

The catalyst to be used is a copper(II) salt and particular examples thereof include copper(II) salts of carboxylic acids such as cupric acetate, cupric pivalate and cupric benzoate; copper(II) salts of weak acids, such as cupric hydrobromide, cupric carbonate and cupric salts of phenols; and copper(II) halides such as cupric chloride and cupric bromide.

The amount of the copper(II) salt to be used ranges from 1 to 3000 mmol, preferably from 10 to 1000 mmol, per liter of the alcohol used.

Further, an alkaline earth metal halide is used together with the above catalyst.

Particular examples of the alkaline earth metal include beryllium, magnesium, calcium and barium and chlorides, iodides and acetates thereof are usable.

It is preferable that the amount of the alkaline earth metal compound to be used range from 1/10 to 10 times (by mole) that of the copper(II) salt and the atomic ratio of halogen to copper in the catalyst system be higher than ½ but below 2.

Alternatively, a compound of a platinum group metal such as ruthenium, palladium or rhodium may be used together with the above copper(II) salt catalyst.

The compound of a platinum group metal may be a halide, acetate or nitrate thereby.

When a halide of a platinum group metal is used, the chlorine concentration of the obtained dialkyl carbonate is a little higher. However, the chlorine content is reduced in each of the subsequent steps to give a diisocyanate compound hardly containing chlorine.

When a platinum group metal compound is used, the molar ratio of the compound to the copper(II) salt is 1 or below, preferably 1/10 or below.

The alcohol to be used as the starting material in this process includes aliphatic ones such as methanol and ethanol and aromatic ones.

Among these alcohols, methanol is most desirable.

When methanol is used, the obtained dialkyl carbonate is dimethyl carbonate.

According to this process, carbon monoxide and oxygen are used as the starting materials in addition to an alcohol. Both materials need not have a particularly high purity but may be diluted with a gas inert to the reaction, for example, nitrogen, argon or carbon dioxide.

The reaction is conducted under a pressure of 1 to 100 atm. When the reaction system is diluted with an inert gas, it is preferable that the partial pressure of carbon monoxide be 0.1 to 10 atm and that of oxygen be 0.1 to 10 atm.

The reaction temperature is preferably 20 to 250° C.

The chlorine content of the dialkyl carbonate thus prepared is at most 15 ppm, even when a chlorine compound (such as copper halide) is used as a catalyst. The chlorine content of a diisocyanate compound prepared by the reaction of the dialkyl carbonate with a diamine which will be described below is still lower.

Meanwhile, the chlorine content of a dialkyl carbonate prepared by the use of phosgene is known to be 150 to 600 ppm.

When a diisocyanate compound is prepared by reacting a dialkyl carbonate having such a chlorine content with a diamine through a urethane compound, the chlorine content of the diisocyanate compound is 15 to 60 ppm, i.e., about 10% of the amount of chlorine contained in the dialkyl carbonate remains in the diisocyanate compound.

Some other processes for preparing a dialkyl carbonate substantially without using phosgene are also known, though they are not industrialized.

Such processes are disclosed in, e.g., Japanese Patent Publication Nos. 8020/1981 and 8816/1986.

These processes are different from those disclosed in the four above-mentioned patent documents (KOKAI Patents and Applications) in respect of the catalyst system used, though they also use carbon monoxide, an alcohol and oxygen as the starting materials.

Of course, the polyurethane coating composition according to the present invention can be prepared also by the use of a dialkyl carbonate prepared by one of these processes.

Next the process for preparing a diisocyanate compound from a dialkyl carbonate and a diamine through a urethane compound will be described.

Japanese Patent KOKAI No. 85956/1989 which has recently been published discloses techniques characterized by preparing a urethane compound from a diamine and dimethyl carbonate and converting the urethane compound into an isocyanate compound. One of these techniques can be utilized in the preparation of the diisocyanate compound to be used in the coating material according to the present invention.

The technique disclosed in the Japanese Patent KOKAI No. 85956/1989 will now be described in more detail. A diisocyanate compound usable in the present invention is prepared by a process which comprises the first step of reacting a diamine with dimethyl carbonate in the presence of an alkali catalyst to form a corresponding urethane compound and the second step of thermally decomposing the urethane compound in a high-boiling solvent in the presence of at least one catalyst selected from the group consisting of manganese, molybdenum, tungsten and zinc under a reduced pressure of 1 to 700 Torr to form a corresponding diisocyanate compound.

The dimethyl carbonate must be one prepared without using phosgene and dimethyl carbonate prepared from carbon monoxide and methanol as the starting materials is preferable because it is inexpensive.

Amines are classified into two groups, i.e., aliphatic amines and aromatic amines from the standpoint of chemical reactivity.

Aliphatic amines react rapidly in the presence of an alkali catalyst and therefore are suitably used in this process.

Aliphatic amines are further classified into two group, i.e., alicyclic amine having an alicyclic skeleton in the molecule and open chain aliphatic amine having a chain skeleton.

Examples of the amine usable in this process are as follows.

Examples of the alicyclic amine include isophoronediamine, 1,3-diaminocyclohexane, 1,4-diaminocyclohexane, 1,3-bis(aminomethyl)cyclohexane, 1,4-bis(aminomethyl)cyclohexane, hydrogenated diaminodiphenylmethane, hydrogenated tolylenediamine and hydrogenated naphthalenediamine.

Isophoronediamine is present as two isomers, one of which has an amino group and an aminomethyl group bonded to the cyclohexane ring in cis configuration and the other of which has the groups bonded thereto in trans configuration. In this process, either of the isomers can be used and also mixtures of the isomers including commercially available isophoronediamines may be used.

Further, a diamine characterized by having amino groups each bonded to a saturated carbon atom and containing an aromatic ring in its skeleton can be suitably used and an example thereof is xylylenediamine.

Examples of the open-chain aliphatic amine include ethylenediamine, hexamethylenediamine, 2,2,4-trimethylhexamethylenediamine, 2,4,4-trimethylhexamethylenediamine, tetramethylenediamine and 1,12-diaminododecane.

Aromatic amines can be also used in the preparation of a urethane according to this process, though they are inferior to aliphatic amines in respect of the space time yield in the first step or the yield.

Examples of the aromatic amines include diaminodiphenylmethane, tolylenediamine, phenylene-1,3-diamine, phenylene-1,4 diamine and naphthalenediamine.

Each of the above mentioned amines may contain a stable group such as an ether linkage, sulfone or carbonyl group or a halogen atom in its skeleton.

The base to be used as a catalyst in the first step may be an alcoholate of an alkali or alkaline earth metal and examples thereof include methylates, ethylates and tertiary butylates of lithium, sodium, potassium, calcium and barium.

The amount of the alkali catalyst is selected depending upon the activity thereof so as to complete the reaction within a practically acceptable time.

When sodium methylate is used, the reaction proceeds at a catalyst concentration of 0.001 to 5% by weight, preferably 0.1 to 3% by weight based on the reaction system.

Although the reaction temperature can be selected within a range of from 0° C. to the boiling point of the reaction system, a lower reaction temperature brings about a slower reaction, while a higher reaction temperature causes more vigorous boiling of the mathanol generated as a by-product. Accordingly, it is preferable that the reaction temperature be selected within a range of from 30° to 80° C.

A solvent inert to the starting materials and the product may be used when the starting material is solid or when it is preferable to prevent generated urethane from precipitating. Examples of the solvent include methanol, ethanol, tetrahydrofuran, dioxane, benzene and toluene.

The basic catalyst is neutralized after the completion of the reaction of the first step, because otherwise it converts the generated urethane into undesirable high-boiling substances when it is heated together with the urethane.

The urethane compound thus prepared is isolated from the neutralized reaction mixture in a state suitably purified by a conventional purification method such as distillation, crystallization, water washing or reprecipitation.

Depending upon the diamine used as the starting material, various urethane compounds are obtained in the first step.

Examples of the urethane compounds include 3-methoxycarbonylaminomethyl-3,5,5 trimethyl-1-methoxycarbonylaminocyclohexane, 1,3-bis(methoxycarbonylamino)cyclohexane, 1,4 bis(methoxycarbonylamino)cyclohexane, 1,3-bis(methoxycarbonylaminomethyl)cyclohexane, 1,4 bis(methoxycarbonylaminomethyl)cyclohexane, bis(methoxycarbonylaminocyclohexyl)methane, methylbis(methoxycarbonylamino)cyclohexane, bis(methoxycarbonylamino)decalin, bis(methoxycarbonylaminomethyl)benzene, bis(methoxycarbonylamino)ethane, bis(methoxycarbonylamino)hexane, 2,2,4-trimethylbis(methoxycarbonylamino)hexane, 2,4,4-trimethylbis(methoxycarbonylamino)hexane, 1,4-bis(methoxycarbonylamino)butane, 1,12-bis(methoxycarbonylamino)dodecane, bis(methoxycarbonylaminophenyl)methane, bis(methoxycarbonylamino)toluene, 1,3-bis(methoxycarbonylamino)benzene, 1,4-bis(methoxycarbonylamino)benzene and bis(methoxycarbonylamino)naphthalene.

These compounds can be thermally decomposed into isocyanate compounds efficiently in the second step More specifically, these urethane compounds are thermally decomposed in the presence of a metal selected from among manganese, molybdenum, tungsten and zinc or an inorganic or organic compound thereof in an inert solvent under a reduced pressure to give a diisocyanate compound having a skeleton corresponding to that of the urethane compound through the elimination of an alcohol molecule.

Examples of the diisocyanate thus prepared include isophorone diisocyanate, cyclohexane-1,3-diisocyanate, cyclohexane 1,4 diisocyanate, 1,3-bis(isocyanatomethyl)cyclohexane, 1,4-bis(isocyanatomethyl)cyclohexane, hydrogenated diphenylmethane diisocyanate, hydrogenated tolylene diisocyanate, hydrogenated naphthalene diisocyanate, xylylene diisocyanate, ethylene diisocyanate, hexamethylene diisocyanate, 2,2,4-trimethylhexamethylene diisocyanate, 2,4,4-trimethylhexamethylene diisocyanate, tetramethylene diisocyanate, dodecane-1,12 diisocyanate, diphenylmethane diisocyanate, tolylene diisocyanate, phenylene-1,3 diisocyanate, phenylene 1,4 diisocyanate and naphthalene diisocyanate.

The catalyst usable in the thermal decomposition includes not only those disclosed in the Japanese Patent KOKAI No. 85956/1989, i.e., metallic manganese, manganese oxides (MnO and $Mn_2O_3$), manganese chloride, manganese sulfate, manganese phosphate, manganese borate, manganese carbonate, manganese acetate, manganese naphthenate, manganese(II) acetylacetonate, manganese(III) acetylacetonate, metallic molybdenum, molybdenum trioxide, molybdenum acetylacetonate [$MoO_2(acac)_2$], molybdenum dioxide, metallic tungsten, tungsten hexacarbonyl, anhydrous tungstic acid and tungstic acid, but also most other catalysts which are generally used in the thermal decomposition of urethane.

These catalysts may be each used as either a hydrate or an anhydrous one.

Particularly, zinc halides, manganese chloride, manganese sulfate, manganese acetate and manganese naphthenate are suitable, because they are easily commercially available and inexpensive and exhibit a high activity.

Among them, manganese acetate is particularly preferable, because it exhibits a sufficiently high activity in the reaction system even at a low concentration.

It is most desirable that the concentration of the catalyst in a solvent be 0.0005 to 5% by weight.

When the reaction temperature is lower than 150° C., the generation of an isocyanate will be unpractically slow, while when it exceeds 300° C., it will be unfavorably difficult to conduct the reaction industrially.

The solvent to be used in the decomposition must be inert to both isocyanate and urethane and may be selected from among aliphatic compounds, aromatic compounds, alkylated aromatic compounds and ethers, which may contain an inert group such as halogen.

The use of a solvent having a boiling point not near that of the isocyanate to be formed is preferable in respect of the easiness of the purification and isolation of the isocyanate.

A solvent having a boiling point lower than that of the isocyanate to be formed evaporates together with the isocyanate in distillation to complicate the decomposition step unfavorably, so that the use of a solvent having a higher boiling point than that of the isocyanate to be formed is preferable.

The reaction is conducted under such a reduced pressure that the formed isocyanate can be recovered from the reaction system as a distillate, by which the isocyanate concentration of the reaction system is kept at a low level, so that side reactions are inhibited and a high yield can be attained.

This effect is more remarkable when the reaction is conducted under the condition where the solvent boils. Accordingly, it is preferable that the reaction pressure be reduced to such an extent that the solvent can boil at the reaction temperature.

The reaction under too low a pressure will make the recovery of an alcohol generated as a by-product difficult and will be disadvantageous in respect of equipment and utilities. Accordingly, it is generally suitable that the reaction pressure be in the range of 1 to 700 Torr.

Preferable examples of the solvent to be used in the second step include o-terphenyl, m-terphenyl, p-terphenyl, mixed diphenylbenzene, partially hydrogenated triphenyl, dibenzylbenzene, dibenzyltoluene, biphenyl, phenylcyclohexane, bicyclohexyl, phenyl ether, benzyl ether, diphenylmethane, xylene, trimethylbenzene, ethylbenzene, dodecylbenzene, chlorobenzene, dichlorobenzene, hexadecane, tetradecane, octadecane, eicosane and tetramethylene sulfone.

It is advantageous when the decomposition is conducted continuously by feeding a urethane compound into a catalyst containing solvent boiling under a reduced pressure.

The alcohol (as a by product) and isocyanate formed by the reaction are introduced together in a gaseous state into a condenser and only the isocyanate is condensed therein to give a product purified efficiently.

If necessary, the diisocyanate thus obtained may be further purified.

Although one technique for preparing a diisocyanate usable in the present invention has been described, the diisocyanate compound usable in the present invention is not limited to those prepared by this process, but includes all diisocyanate compounds prepared from dimethyl carbonate prepared substantially without using phosgene in any step and a diamine.

For example, a technique of preparing a urethane compound by reacting dimethyl carbonate with an amine in the pressure of a Lewis acid which is disclosed in Japanese Patent Publication No. 33095/1976 can be employed in the reaction of the first step.

Further, the above-mentioned technique of the second step may be replaced by a technique of conducting the thermal decomposition in a gas phase (see Japanese Patent KOKAI Nos. 205352/1984 and 205353/1984), another liquid-phase technique (see Japanese Patent Publication No. 45736/1982) or a technique of preparing isophorone diisocyanate from isophorone dicarbamate by the use of $SnO_2$ or CuO as a catalyst (see Japanese Patent KOKAI No. 238255/1987).

A polyurethane usable in the preparation of the coating material according to the present invention can be produced by the polyaddition of the obtained diisocyanate with a polyol such as polyether polyol, polyester polyol or polycarbonate diol.

The process of the present invention is applicable to the production of various polyurethane coating materials and examples thereof include coating for optical fibers described in Japanese Patent KOKAI Nos. 135872/1989, 172416/1989, 242613/1989, 195115/1985 and 7714/1987; radiation curable coatings described in Japanese Patent KOKAI Nos. 36577/1985 (U.S. Pat. No. 509389) and 116620/1987 (U.S. Pat. No. 779838); coatings of cathodic electrodeposition type described in Japanese Patent KOKAI Nos. 74969/1987, 68861/1987, 161073/1989, 87765/1986, 145201/1986, 174277/1987, 43967/1988 and 85262/1989; polyurethane coatings described in Japanese Patent KOKAI No. 250069/1985, 99274/1986, 164738/1987, 619/1990 (U.S. Pat. No. 549209) and 4878/1990 (DE 3803628); one pack urethane baking coatings described in Japanese Patent KOKAI No. 48777/1979 (DE 2732622), 48896/1979 (DE 2732775) and 50969/1981 (DE 2938855), Japanese Patent Publication No. 4068/1983 (DE 2346818), Japanese Patent KOKAI No. 4658/1984 (DE 3221558) and Japanese Patent Publication No. 50265/1989 (DE 3030544); two pack acrylic urethane and polyester urethane coatings prepared by the use of polyisocyanate described in Japanese Patent KOKAI Nos. 118553/1983 (DE 3151853), 95259/1984, 176625/1986, 143978/1980 (DE 3151855), 118575/1983 (DE 3151855), 78460/1982 (DE 303864), 181114/1985 and 28518/1986; Japanese Patent Publication Nos. 33852/1986 and 2865/1984; and Japanese Patent KOKAI Nos. 5837/1972 (DE 2043493), 41929/1975 (DE 2325824), 255861/1985, 283669/1986, 30160/1987 and 277472/1987; urethane powder coatings prepared by the use of a blocked isocyanate as a curing agent described in Japanese Patent KOKAI Nos. 121773/1978 (DE 2712931), 84584/1979 (DE 2751805) and 44670/1979 (DE 2729704); Japanese Patent Publication Nos. 41062/1985 (DE 2929224) and 5627/1989 (DE 3030558), Japanese Patent KOKAI Nos. 49761/1981 (DE 2929150), 47079/1985 (DE 3322718), 53511/1985 (DE 3328131) and 63324/1982 (DE 3030539), Japanese Patent Publication Nos. 51190/1981 (DE 2105777) and 31744/1986 (DE 2735497); and primer coatings and anti-corrosive coatings using a urethane prepolymer described in Japanese Patent KOKAI Nos. 146965/1987 (US 808762/A), 13858/1985 (DE 3322723), 169864/1987 and 246972/1987.

Among these urethane coatings according to the prior art, the preparation of a polyurethane resin coating will now be described in more detail.

The organic diisocyanate compound to be used is not particularly limited, but may be any one unless it is one prepared directly from phosgene and a diamine.

However, the use of an alicyclic diisocyanate which is inherently characterized by high yellowing resistance is more effective.

One or more of such diisocyanates may be used.

In the preparation of the coating, a chain-extending agent may be present if needed.

The chain-extending agent may be a low-molecular weight compound having an active hydrogen and examples thereof include ethylene glycol, propylene glycol, 1,4-butylene glycol, 2-methylpropanediol, neopentyl glycol, pentanediol, 1,6-hexanediol, ethylenediamine, propylenediamine hydrazine, isophoronediamine, m-phenylenediamine, 4,4,'-diaminodiphenylmethane, diaminodiphenyl sulfone and 3,3,'-dichloro 4,4,'-diaminodiphenylmethane.

In the present invention, a polyurethane may be produced by either a prepolymer process which comprises reacting a polyol described above with an excess of an organic diisocyanate to form a prepolymer having terminal isocyanate groups and reacting the prepolymer with a chain-extending agent such as a diol or diamine to give a polyurethane or a one-shot process characterized by adding all of the components simultaneously to produce a polyurethane.

These reactions may be conducted either in the absence of any solvent or in a solvent.

The solvent is preferably an inert one and particular examples of the solvent include toluene, ethyl acetate, butyl acetate, methyl ethyl ketone, dimethylformamide and tetrahydrofuran.

Further, a suitable catalyst may be used in the formation of polyurethane. Examples of the catalyst include organotin compounds such as tin octanoate and dibutyltin dilaurate; and tertiary amines such as N-methylmorpholine and triethylamine.

The polyurethane thus produced is particularly excellent in yellowing resistance.

On the other hand, the polyurethane coating composition according to the present invention is further improved in weatherability, corrosion resistance, heat resistance and so on.

In the process according to the present invention, it is essential to use a diisocyanate prepared by reacting a dialkyl carbonate, represented by dimethyl carbonate, which has been prepared without using phosgene with a diamine.

Although a dialkyl carbonate itself was formerly prepared by the use of phosgene as the starting material, also a process for the preparation thereof using carbon monoxide as the starting material is now carried out practically and new techniques for conducting the process industrially are being established.

The chlorine content of a diisocyanate prepared by reacting a dialkyl carbonate prepared by the use of phosgene as the starting material with a diamine through a urethane compound varies in the range of 10 to 50 ppm as described above unlike that of a diisocyanate prepared by using a dialkyl carbonate prepared from carbon monoxide, an alcohol and oxygen.

When the chlorine content of the isocyanate to be converted into polyurethane varies as in the above case, the addition of a protonic acid is somewhat troublesome, because the isocyanate must be previously examined for chlorine content to thereby determine the amount of a protonic acid to be added.

On the other hand, a diisocyanate hardly containing chlorine which is prepared by reacting a dialkyl carbonate prepared without using phosgene with a diamine to give a urethane and thermally decomposing the urethane need not be previously examined for chlorine content, because the chlorine content of such a diisocyanate is as low as 1 ppm or below and constant.

Processes for preparing dialkyl carbonates without using phosgene are disclosed in Japanese Patent KOKAI Nos. 57522/1988, 72650/1988, 72651/1988, 287062/1989 and 58739/1985 and Japanese Patent Publication Nos. 8020/1981, 23662/1985, 8816/1986, 43338/1986, 38018/1988 and 8113/1987. In these processes, carbon monoxide, an alcohol and oxygen are used as the starting materials and are reacted in the presence of a catalyst under a normal or elevated pressure.

Further, a process which comprises preparing an alkylene carbonate from an alkylene oxide and carbon dioxide and reacting the carbonate with methanol to give dimethyl carbonate is known as another process of preparing a dialkyl carbonate without using phosgene.

Processes for preparing alkylene carbonates from alkylene oxide and carbon dioxide are disclosed in, e.g., Japanese Patent Publication No. 27314/1973 and Japanese Patent KOKAI Nos. 13720/1976, 19722/1976, 723/1976 118763/1976 and 128382/1984.

On the other hands, processes for preparing dialkyl carbonates from alkylene carbonate, and alcohol are disclosed in, e.g., Japanese Patent Publication Nos. 22697/1985, 22698/1985, 4381/1986, 708/1981, 16267/1986, 27658/1985 and 28542/1984 and Japanese Patent Application Nos. 178347/1989 and 8348/1989.

Of course, diisocyanates each prepared from a dialkyl carbonate prepared by one of these processes and a diamine through a urethane compound can be suitably used in the process of the present invention. According to the present invention, a protonic acid is added to a diisocyanate compound in order to promote the conversion thereof into polyurethane and the term "protonic acid" used in this specification is a generic term for a Brønsted acid which releases a proton depending upon the inherent acid dissociation constant (pKa) as represented by the formula (I):

$$RH \xrightarrow{pKa} R^- + H^+$$

Examples of the protonic acid to be added to a diisocyanate according to the present invention for the purpose of promoting the conversion thereof into polyurethane include mineral acids such as nitric, sulfuric, phosphoric and phosphorous acids; saturated organic acids having 1 to 18 carbon atoms, such as formic, acetic, propionic, butyric, caproic, caprylic, capric, lauric, myristic, palmitic and stearic acids; unsaturated organic acids having 3 to 18 carbon atoms, such as acrylic, methacrylic, vinylacetic, sorbic, oleic, linoleic and linolenic acids and dimer acids thereof; alkyl- and alkenyl-substituted derivatives of aromatic organic acids such as cinnamic, benzoic and salicylic acids, with the alkyl or alkenyl substituent having 1 to 18 carbon atoms; polybasic acids having 2 to 18 carbon atoms, such as oxalic, adipic, malonic, palmitic, phthalic, isophthalic, trimellitic and pyromellitic acids and partial esters thereof; alkylsulfuric acids having 1 to 18 carbon atoms, alkenylsulfuric acids having 2 to 18 carbon atoms and alkylphenylsulfuric acids having 6 to 24 carbon atoms, such as laurylsulfuric, p-toluenesulfonic and dodecylbenzenesulfonic acids; phosphinic and phosphonic acids each having an alkyl group having 1 to 18 carbon atoms, an alkenyl group having 2 to 18 carbon atoms or an alkylphenyl group having 6 to 24 carbon atoms such as dimethylphosphinic, diethylphosphinic, diphenylphosphinic, dimethylphosphonic, diethylphosphonic and diphenylphosphonic acids; and phosphites and phosphates each having an alkyl group having 1 to 18 carbon atoms, an alkenyl group having 2 to 18 carbon atoms or an alkylphenyl group having 6 to 24 carbon atoms, such as dimethyl phosphite, diethyl phosphite, diphenyl phosphite, dimethyl phosphate, diethyl phosphate, diphenyl phosphate and 2-ethylhexyl phosphate.

Among these protonic acids which serve to promote the conversion of diisocyanate into polyurethane, saturated organic acids are particularly useful, because most of them are either liquid at room temperatures or easily liquefiable by heating, are highly soluble in diisocyanate and are commercially available generally at a low cost.

The amount of the protonic acid to be added in order to promote the conversion of a diisocyanate compound prepared from dimethyl carbonate prepared substantially without using phosgene in any preparation step and a diamine into a polyurethane ranges from $1 \times 10^{-7}$ to $1 \times 10^{-1}$ equivalent, preferably from $1 \times 10^{-6}$ to $1 \times 10^{-2}$ equivalent per equivalent of the NCO group.

When the amount of the protonic acid is less than $1 \times 10^{-7}$ equivalent per equivalent of the NCO group, it will be too small to promote the conversion of a diisocyanate into a polyurethane, while when the amount is larger than $1 \times 10^{\circ}$ equivalent, not only will no additional effect be attained but also the protonic acid will react with a diisocyanate to lower the quality and the performance of the polyurethane.

According to the present invention, the addition of a protonic acid for promoting the conversion of a diisocyanate prepared from dimethyl carbonate and a diamine into a polyurethane may be conducted either by previously adding a predetermined amount of a protonic acid to a diisocyanate to form a composition having an enhanced reactivity or by feeding a protonic acid and a diisocyanate into a reactor simultaneously like in the case of other catalyst.

It is important that the water content of the protonic acid to be added be previously lowered as much as possible. If a large amount of water is mixed into a diisocyanate compound, the compound will be converted into a urea or an allophanate to bring about a lowering in the quality.

If necessary, the obtained diisocyanate may be further purified.

Although one technique for preparing a diisocyanate which can be suitably used in the present invention has been described above, all diisocyanates prepared from dimethyl carbonate and a diamine can be suitably used in the present invention.

For example, another technique of preparing a urethane compound from dimethyl carbonate and an amine (disclosed in Japanese Patent Publication No. 33095/1976) may be employed in the reaction of the above first step.

Further, the reaction of the above second step may be conducted by a technique of conducting the thermal decomposition in a gas phase (see Japanese Patent KOKAI Nos. 205352/1984 and 205353/1984) or another liquid-phase technique (see Japanese Patent Publication No. 45736/1982).

A polyurethane can be produced by the polyaddition of a diisocyanate thus prepared with a polyol such as polyether polyol or polyester polyol and, if necessary, a compound having an active hydrogen atom, such as mono- or poly-hydric alcohol, mono- or poly-amine or water. Various additives such as a pigment or colorant may be added to the polyaddition system.

EFFECT OF THE INVENTION

According to the present invention, a diisocyanate which exhibits poor reactivity in the conversion into polyurethane can be improved in its reactivity.

More specifically, by the addition of a protonic acid or a Lewis acid, the reactivity of a diisocyanate prepared from dimethyl carbonate and a diamine is improved to a level equivalent or superior to that of a diisocyanate prepared by a conventional phosgene process using a diamine. Further, since the diisocyanate is free from the impurities resulting from phosgene, the polyurethane prepared therefrom exhibits weatherability, corrosion resistance and heat resistance better than those of a conventional polyurethane.

Particular examples of the Lewis acid to be added to a diisocyanate for the purpose of promoting the conversion thereof into a polyurethane and preparing a diisocyanate composition improved in reactivity include halides of manganese, tin, zinc, iron, magnesium, antimony, titanium, boron and aluminum and salts thereof; salts of manganese, tin, zinc, lead, iron, magnesium, antimony and titanium with an aromatic organic acid substituted with an alkyl or alkenyl group having 1 to 18 carbon atoms, a polybasic acid having 2 to 18 carbon atoms such as oxalic, adipic, malonic, palmitic, phthalic, isophthalic, trimellitic and pyromellitic acids and partial esters thereof; compounds of dialkyltin with a saturated organic acid having 1 to 18 carbon atoms or an unsaturated organic acid having 3 to 18 carbon atoms wherein said alkyl group has 1 to 6 carbon atoms; compounds of aluminum with a saturated organic acid having 1 to 18 carbon atoms, an unsaturated organic acid having 3 to 18 carbon atoms, C substituted aromatic acid, a polybasic acid having 2 to 18 carbon atoms such as oxalic, adipic, malonic, palmitic, phthalic, isophthalic, trimellitic and pyromellitic acids and partial esters thereof; and alkyl oxides having 1 to 18 carbon atoms of manganese, tin zinc, lead, iron, magnesium, antimony, titanium or aluminum.

Among these Lewis acids, a dialkyltin compound contains an active hydrogen to efficiently promote the conversion of isocyanate into polyurethane as will be shown by chemical formula 2, thus being particularly useful.

The amount of the Lewis acid to be added in order to promote the conversion of a diisocyanate prepared from dimethyl carbonate prepared substantially without using phosgene in any step and a diamine through a urethane compound into a polyurethane ranges from $1 \times 10^{-8}$ to $1 \times 10^{-2}$ equivalent, preferably from $1 \times 10^{-6}$ to $1 \times 10^{-3}$ equivalent per equivalent of the NCO group.

When the amount of the Lewis acid is less than $1 \times 10^{-8}$ equivalent per equivalent of the NCO group, it will be too small to promote the conversion of a diisocyanate into a polyurethane, while when the amount is larger than $1 \times 10^{-2}$ equivalent, not only no additional effect will be attained but also the Lewis acid will react with a diisocyanate to lower the quality and the performance of the polyurethane.

The addition of the Lewis acid in order to promote the conversion of a diisocyanate compound prepared from dimethyl carbonate prepared substantially without using phosgene and a diamine through a urethane compound into a polyurethane can be carried out by either of the following two methods.

One method comprises previously adding a predetermined amount of a Lewis acid to a diisocyanate to prepare a composition improved in reactivity.

The other method comprises feeding a Lewis acid together with a diisocyanate compound into a reactor in the preparation of a urethane coating material like in the case of other catalysts.

It is important that the water content of the Lewis acid to be added is previously lowered as much as possible. If a large amount of water is mixed into a diisocyanate, the diisocyanate will be converted into a urea or an allophanate to bring about a lowering in the quality of the polyurethane.

The diisocyanate compound to be used in the present invention is prepared by the reaction of a diamine with dimethyl carbonate.

Although dimethyl carbonate was formerly prepared by using phosgene as the starting material, also a process for the preparation thereof using carbon monoxide as the starting material is now conducted practically and new techniques for conducting the process industrially have been studied (see Japanese Patent Application Nos. 201568/1986, 215178/1986 and 15179/1986). The preparation of a diisocyanate using dimethyl carbonate prepared by this process is more advantageous in respect of cost.

According to the present invention, a technique of enhancing the reactivity of a diisocyanate has been established to thereby enable the production of a polyurethane which is improved in weatherability, corrosion resistance and heat resistance and can be suitably used in coatings, adhesives and moldings.

SYNTHESIS EXAMPLE 1

Synthesis of Dimethyl Carbonate without Using Phosgene—Synthesis of Dimethyl Carbonate from Carbon Monoxide and Methanol The synthesis of dimethyl carbonate was conducted by the use of a 5-l autoclave coated with Teflon.

A mixed gas comprising 47.5% by volume of nitrogen and 22.5% by volume of argon/oxygen (oxygen concentration: 33% by volume) were fed into the autoclave at 12.0 kg/cm² and reacted by the use of 526 ml of a methanol solution containing palladium chloride in an amount of 7.5 mmol/l, cuprous acetate in an amount of 187.5 mmol/l and magnesium chloride in an amount of 187.5 mmol/l as a catalyst at 130° C. for one hour.

The obtained reaction mixture was distilled to give dimethyl carbonate. The same procedure as that described above was repeated twenty times to give 234 g in total of dimethyl carbonate.

The chlorine content of this dimethyl carbonate was about 11 ppm.

The chlorine content was determined with an ion chromatograph (IC-500).

SYNTHESIS EXAMPLE 2

The same procedure as that described in Synthesis Example 1 was repeated twenty times except that sodium chloride was used instead of the magnesium chloride. Thus, about 352 g in total of dimethyl carbonate was obtained.

The reaction of this Synthesis Example proceeded in a state wherein the catalyst was dispersed in the liquid medium.

The chlorine content of the obtained dimethyl carbonate was about 8 ppm.

SYNTHESIS EXAMPLE 3

Synthesis of Urethane Compound 211 g of the dimethyl carbonate prepared in Synthesis Example 1 was fed into a round-bottomed flask fitted with a stirrer and heated in a stream of nitrogen under stirring to 70° C.

5.22 g of a 28% methanol solution of sodium methylate and 50 g of isophoronediamine were fed into the above flask respectively with two feed pumps at constant rates over a period of 70 minutes.

During this feeding, the reaction temperature was kept at 70° C.

After the completion of the feeding, the reaction mixture was aged at that temperature for 3 hours, neutralized with phosphoric acid and analyzed by gas chromatography. It was ascertained that a urethane compound corresponding to isophoronediamine, i.e., 3-methoxycarbonylaminomethyl-3,5,5-trimethyl-1-methoxycarbonylaminocyclohexane (abbreviated to "isophorone dicarbamate" or "IPDC") was obtained in a yield of 99% based on the isophorondiamine and in a yield of 99% based on the consumed dimethyl carbonate.

The obtained reaction mixture was topped and washed with water to give IPDC, which was used in Synthesis Example 5 as a starting material.

SYNTHESIS EXAMPLE 4

The same procedure as that of Synthesis Example 3 was repeated except that the dimethyl carbonate prepared in Synthesis Example 2 was used instead of the one of Synthesis Example 1. Isophorone dicarbamate was obtained in a yield nearly equal to that of Synthesis Example 3.

The obtained reaction mixture was topped and washed with water to give IPDC, which was used in Synthesis Example 6 as a starting material.

SYNTHESIS EXAMPLE 5

Synthesis of Diisocyanate Compound

The 3-methoxycarbonylaminomethyl-3,5,5-trimethyl-1-methoxycarbonylaminocyclohexane (abbreviated to "isophorone dicarbamate" or "IPDC") prepared in Synthesis Example 3 was continuously decomposed in a 200-ml glass reboiler equipped with a 10-plate Oldershaw column.

m-Terphenyl was used as a solvent 117 ml of m-terphenyl and 10 ppm (based on the m-terphenyl) of anhydrous manganese acetate were fed into the reboiler. The contents were heated under a reduced pressure of 10 Torr to boil the contents.

A liquid mixture comprising 59.0% by weight of IPDC and 41.0% by weight of m-terphenyl was fed into the reactor at a rate of 120 g/hr.

The continuous decomposition was conducted while the isophorone diisocyanate (abbreviated to "IPDI") formed as a product was withdrawn from the top of the distillation column and the bottom was withdrawn at such a rate as to keep the liquid level in the reactor constant.

Warm water at 60° C. was passed through the condenser, by which IPDI was condensed therein while methanol was expelled in the gaseous form.

During the decomposition, the concentration of anhydrous manganese acetate in the reaction system was kept at 10 ppm by feeding a 125 ppm methanolic solution of anhydrous manganese acetate depending upon the amount of the bottom.

At a point of time when the column temperature and the weights and compositions of the distillate and the bottom became constant, a distillate comprising 77.2% by weight of IPDI, 22.7% by weight of monoisocyanate (abbreviation: IPMI) and 0.05% by weight of m-terphenyl was distilled out at a rate of 18.2 g/hr. The temperature of the reactor was 245° C.

The conversion of IPDC was 99% by weight and the conversion of IPDC into high boiling fraction was 6% by weight.

The yields of IPDI and IPMI were 74% and 19%, respectively, based on the fed IPDC.

The chlorine content of the obtained IPDI was 0.2 ppm.

SYNTHESIS EXAMPLE 6

Anhydrous manganese acetate was dissolved in methanol in a concentration of 1% by weight.

The obtained solution was diluted 80-fold with IPDI to give a 125 ppm catalyst solution.

This catalyst solution was homogeneous and had a low viscosity.

The decomposition of IPDC was conducted in a similar manner to that of Synthesis Example 5 except that IPDC was introduced into the fifth plate from the bottom in the distillation column, while the plate into which the catalyst was fed was changed to the thirteenth one from the bottom.

At a point of time when the column temperature and the weights and compositions of the distillate and the bottom became constant, a distillate comprising 98.1% by weight of IPDI, 1.8% by weight of IPMI and 0.05% by weight of m terphenyl was distilled out in 1 hour.

The conversion of IPDC was 99% by weight and the conversion of IPDC into high boiling fraction was 2% by weight.

The yields of IPDI and IPMI were 95.5% and 1.5%, respectively, based on the fed IPDC.

The obtained IPDI was further purified by batch distillation to a purity of 99.7% and the purified IPDI was used in the following Test Examples as a starting material.

The chlorine content of the obtained IPDI was 0.1 ppm.

TEST EXAMPLE 1

The IPDI prepared in Synthesis Example 5 (hereinafter referred to as the "DMC-process IPDI") and a commercially available IPDI which is thought to be prepared by the phosgene process (hereinafter referred to as the "phosgene-process IPDI") were irradiated with ultraviolet rays to determine the changes in appearance and NCO weight percentage with time, by which both were compared with each other in respect of weathering resistance.

An ultraviolet lamp of 50 mW/min was used and each sample was put in a heat-resistant bottle purged with nitrogen and kept at 50° C.

At the beginning of the test, the appearances of the DMC-process IPDI and phosgene process IPDI were 10 and 8, respectively, as determined according to APHA.

The appearances of these IPDIs after one week were 30 and 60, respectively, those after two weeks were 50 and 75, respectively, and those after four weeks were 70 and 90, respectively. At any point of time, the discoloration of the DMC-process IPDI was slighter than that of the phosgene-process IPDI, i.e., the former IPDI was superior to the latter one. On the other hand, the NCO weight percentage was nearly theoretical in any determination, i.e., no change in the NCO weight percentage was observed.

TEST EXAMPLE 2

The DMC-process IPDI prepared in Synthesis Example 6 and the phosgene-process IPDI were each kept at 50° C. in a container to determine the changes in appearance and NCO weight percentage with time, by which both were compared with each other in respect of heat resistance.

Each sample was put in a heat resistant bottle purged with nitrogen and the resulting bottle was stored in an oven kept at 50° C.

At the beginning of the test, the appearances of the DMC-process IPDI and the phosgene-process IPDI were 10 and 8, respectively, as determined according to the APHA standard.

The appearances of the DMC process IPDI and the phosgene-process IPDI after 3 months were 20 and 80, respectively. It was ascertained that the discoloration of the DMC-process IPDI was slighter than that of the phosgene-process IPDI, i.e., the former IPDI is superior to the latter one in this respect.

The NCO weight percentage was nearly theoretical in any determination, i.e., no change in the NCO weight percentage was observed.

DETERMINATION OF TOTAL CHLORINE CONTENT

The total chlorine content of the DMC-process IPDI or the phosgene-process IPDI was determined according to ASTM D 1638.

The total chlorine content of a commercially available phosgene-process IPDI was 245 ppm.

As well known with respect to, e.g., epoxy resins, a resin material containing a large amount of chlorine seriously corrodes metallic material in contact therewith. Accordingly, it is apparent that the polyurethane of the present invention exhibits better characteristics for metallic materials than those of a conventional polyurethane.

It is apparent that the polyurethane coating material of the present invention is superior to a conventional one in weatherability, corrosion resistance and heat resistance, because the polyurethane used therein is one prepared from a diisocyanate which is superior to a conventional one in these characteristics.

EXAMPLE 1

44.4 g of the IPDI prepared in Synthesis Example 6, 200 g of polycaprolactonediol having a number-average molecular weight of 2000 (a product of Daicel Chemical Industries, Ltd., trade name: PLC-220) and 46.2 mg ($1.12 \times 10^{-4}$ equivalents per isocyanate group) of dibutyltin dilaurate were fed into a reactor fitted with a thermometer, a stirrer, a nitrogen inlet tube and a condenser and heated to 120° C. in a nitrogen atmosphere under stirring for 3 hours to conduct a reaction. Thus, a urethane prepolymer having an NCO content of 3.3% by weight was obtained. After the temperature of the reactor had been lowered to 40° C., 199 g of xylene and 161 g of methyl isobutyl ketone (MIBK) were added to the urethane prepolymer to give a homogeneous solution.

16.8 g of isophoronediamine (IPD), 0.4 g of diisobutylamine, 38.0 g of MIBK and 199 g of isopropanol were added to the solution to conduct a chain-extending reaction with a diamine.

The reaction was conducted at a temperature kept at 50° C. for 3 hours to give an objective polyurethane resin solution.

This polyurethane resin solution had a solid content of 30.8% by weight, a viscosity of 30400 cP/25° C. and a residual NCO content of less than 0.05% by weight.

EXAMPLE 2

Another polyurethane resin solution was prepared in a similar manner to that of Example 1 with the same equipment as that used in Example 1 except that 200 g of a polytetramethylene glycol having a number-average molecular weight of 2000 (a product of Hodogaya Chemicals Co., Ltd., trade name: PTG 2000) was used instead of the polycaprolactonediol.

This polyurethane resin solution had a solid content of 31.5% by weight, a viscosity of 27400 cP/25° C. and a residual NCO content of less than 0.04% by weight.

COMPARATIVE EXAMPLE 1

Another polyurethane resin solution was prepared in a similar manner to that of Example 1 with the same equipment as that used in Example 1 except that an IPDI prepared by the use of phosgene was used instead of the IPDI prepared in Synthesis Example 6.

This polyurethane resin solution had a solid content of 30.6% by weight, a viscosity of 28600 cP/25° C. and a residual NCO content of less than 0.01% by weight.

COMPARATIVE EXAMPLE 2

Another polyurethane resin solution was prepared in a similar manner to that of Example 1 with the same equipment as that used in Example 1 except that an IPDI prepared by the use of phosgene was used instead of the IPDI prepared in Synthesis Example 6.

This polyurethane resin solution had a solid content of 31.2% by weight, a viscosity of 9000 cP/25° C. and a residual NCO content of less than 0.01% by weight.

EXAMPLE 3

2000 g of a polycarbonatediol having a number-average molecular weight of 1000 (a product of Daicel Chemical Industries, Ltd., PCD 210), 666 g of the IPDI prepared in Synthesis Example 6, 0.1 g (100 mg) of dibutyltin dilaurate and 0.5 g of p-methylbenzoic acid were fed into a reactor fitted with a thermometer, a stirrer, a nitrogen inlet tube and a condenser and reacted at 60° to 70° C. for 5 hours to give a urethane prepolymer.

The temperature was lowered to 50° C., followed by the addition of 1.3 g of t-butylhydroquinone, 255 g of 2-hydroxyethyl acrylate and 0.3 g (300 mg) of dibutyltin dilaurate. The obtained mixture was reacted for 5 hours to give a urethane acrylate resin.

20 g of hexamethylene glycol diacrylate, 10 g of N-vinylpyrrolidone, 5 g of benzyl dimethyl ketal and 5 g of benzophenone were added to 60 g of the above resin to give an ultraviolet-curable coating resin composition.

COMPARATIVE EXAMPLE 3

Another ultraviolet-curable coating resin composition was prepared in a similar manner to that of Example 3 with the same equipment as that used in Example 3 except that an IPDI prepared by the use of phosgene was used instead of the IPDI prepared in Synthesis Example 6.

EXAMPLE 4

1500 g of the IPDI prepared in Synthesis Example 6 was fed into a reactor fitted with a thermometer, a stirrer, a nitrogen inlet tube and a condenser and heated to 70° C. under stirring. 134 g of molten trimethylolpropane (TMP) was dropped into the reactor over a period of 3 hours. The resulting mixture was reacted at that temperature for an additional 3 hours to give a urethane prepolymer solution.

Since this solution contained unreacted IPDI, the solution was treated with a thin-film evaporator mfd. by Shinko Pfaudler Co., Ltd. under the conditions which will be described to give an IPDI/TMP adduct free from unreacted IPDI as the bottoms. This bottoms was immediately dissolved in ethyl acetate to give an IPDI/TMP adduct solution having a solid content of 74.2% by weight, an NCO content of 10.7% by weight and a residual IPDI content of 0.7% by weight.

| feed rate of urethane prepolymer solution: | 500 to 600 l/m²/min. |
| --- | --- |
| heating medium temperature: | 190° C. |
| temperature of bottom line: | 170° C. |
| degree of vacuum: | 1 mmHg or below |

COMPARATIVE EXAMPLE 4

Another IPDI/TMP adduct solution having a solid content of 75.2% by weight, an NCO content of 10.9% by weight and a residual IPDI content of 0.6% by weight was prepared in a similar manner to that of Example 4 with the same equipment as that used in Example 4 except that an IPDI prepared by the use of phosgene was used instead of the IPDI prepared in Synthesis Example 6.

EXAMPLE 5

An isocyanurate-containing IPDI derivative having an NCO content of 17.5% by weight (hereinafter referred to as the "IPDI trimer") was prepared by the use of the IPDI prepared in Synthesis Example 6 by a process described in Japanese Patent KOKAI No. 143978/1980 (German Patent No. 2916201) or German Patent No. 2724914 or 2644684.

Further a blocked polyisocyanate solution was prepared by the use of this IPDI trimer according to a process described in Japanese Patent KOKAI No. 44896/1979 (German Patent No. 2732775), 48777/1979 (German Patent No. 2732662) or 50969/1981 (German Patent No. 2938855).

500 g of the above IPDI trimer and 366 g of a solvent mixture comprising xylene and butyl acetate at a weight ratio of 3 : 5 were fed into a reactor fitted with a thermometer, a stirrer, a nitrogen inlet tube and a condenser and stirred to form a solution. This solution was heated to 70° C.

180 g of methyl ethyl ketoxime sufficiently purged with nitrogen was dropped into the solution over a period of 2 hours to block the isocyanate groups. Thus, a blocked polyisocyanate solution having a solid content of 65.2% by weight and containing a blocked isocyanate group in a concentration of about 8% by weight and an isocyanate group in a concentration of less than 0.1% by weight was obtained.

COMPARATIVE EXAMPLE 5

Another blocked polyisocyanate solution having a solid content of 65.5% by weight and containing blocked isocyanate groups in a concentration of about 8% by weight and an isocyanate group in a concentration of less than 0.1% by weight was prepared in a similar manner to that of Example 5 with the same equipment as that used in Example 5 except that an IPDI prepared by the use of phosgene was used instead of the IPDI prepared in Synthesis Example 6.

APPLICATION EXAMPLE 1

A mixture prepared by adding 50 parts by weight of titanium oxide (a product of Ishihara Sangyo Kaisha, Ltd.; Typaque CR-90), 70 parts by weight of an MIBK/toluene/IPA mixture (weight ratio: 30:30:40), 0.75 part by weight of Disparlon 1860 (a product of Kusumoto Kasei K.K., leveling agent), 0.75 part by weight of Disparlon 1984 50 (a product of Kusumoto Kasei K.K., wetting dispersant) and 0.75 part by weight of Disparlon OX-77 (a product of Kusumoto Kasei K.K., antifoaming agent) to 100 parts by weight of each of the polyurethane resin solutions prepared in Examples 1 and 2 and Comparative Examples 1 and 2, and 150 parts by weight of glass media having a diameter of 3 mm were treated together with a vibrating dispersion mill for about one hour to give a white enamel coating.

This enamel coating was applied to a zinc phosphate treated rolled steel sheet, which had been preliminarily degreased, with a No. 40 bar coater and dried at room temperature and a humidity of 60 to 70% for one week.

The resulting coated sheet was examined for adhesion, heat resistance and humidity resistance and the results are given in Table 1. The polyurethane coating according to the present invention exhibited more improved weatherability and heat resistance.

APPLICATION EXAMPLE 2

The ultraviolet-curable coating resin compositions prepared in Example 3 and Comparative Example 3 were each applied to a zinc phosphate-treated rolled steel sheet, which had been preliminarily degreased, with a No. 20 bar coater.

The resulting coating layers were cured by the irradiation with a high-voltage mercury lamp fitted with a condenser reflector having an output of 1 kW and a power density of 40 W/cm (mfd by Iwasaki Electric Co., Ltd.) at a conveyor speed of 10 m/min.

The resulting coated steel sheets were examined for adhesion, weatherability and heat resistance and the results are given in Table 2. The polyurethane resin coating according to the present invention exhibited improved resistance to weatherability and heat resistance.

APPLICATION EXAMPLE 3

50 parts by weight of titanium oxide (a product of Ishihara Sangyo Kaisha, Ltd. Typaque CR-90), 4.8 parts by weight of Disparlon A 603 20X (a product of Kusumoto Kasei K.K., thixotropic agent), 0.75 part by weight of Disparlon #4200-20 (a product of Kusumoto Kasei K.K., wetting dispersant), 1.2 parts by weight of Disparlon L1894-50 (a product of kusumoto Kasei K.K., leveling agent) and 40 parts by weight of a butyl acetate/xylene (weight ratio: 1 : 1) mixture were added to 100 parts by weight of Acrydic A-801 (a product of Dainippon Ink and Chemicals, Inc., solid content: 50±1%, hydroxyl number 50±1 mg/KOH/g). The obtained mixture was treated with a batch sand mill (mfd. by Kansai Paint Co., Ltd.) to give a white base.

7.1 parts by weight of Coronate EH (a product of Nippon Polyurethane Industry Co., Ltd ), 3.6 parts by weight of the IPDI/TMP adduct solution prepared in Example 4 or Comparative Example 4 and 75 parts by weight of a butyl acetate/xylene mixture (of a weight ratio of 1:1) were added to 100 parts by weight of the above white base to give a two-pack acrylic urethane coating material.

This coating material was applied to a zinc phosphate-treated rolled steel sheet, which had been preliminarily degreased, by air spraying and cured at 20° C. for one week and at 60° C. for 30 minutes to form an acrylic urethane coating film having a dry film thickness of 30 to 40 μm.

The coated steel sheets thus obtained were examined for adhesion, weatherability and heat resistance and the results are given in Table 3. The polyurethane resin coating according to the present invention exhibited improved weatherability, corrosion and heat resistances.

APPLICATION EXAMPLE 4

56.2 parts by weight of titanium oxide (a product of Ishihara Sangyo Kaisha, Ltd.; Typaque CR-90), 0.75 part by weight of Disparlon 1860 (a product of Kusumoto Kasei K.K., leveling agent), 0.75 part by weight of Disparlon 1984 50 (a product of Kusumoto Kasei K.K., wetting dispersant), 0.75 part by weight of Disparlon OX 77 (a product of Kusumoto Kasei, K.K., anti-foaming agent), 5.0 parts by weight of a 10% Scat 14X (a product of Sankyo Yukigosei K.K., catalyst) and 24 parts by weight of a butyl acetate/Solvesso 150 mixture (of a weight ratio of 1:1) were added to 100 parts by weight of Oxyester Z 1439 (a product of Dainippon Ink and Chemicals, Inc., solid content: 60%, hydroxyl number 130±5 mgKOH/gNV). The obtained mixture was treated with a batch sand mill (mfd. by Kansai Paint Co., Ltd.) to give a white base.

38.3 parts by weight of the blocked polyisocyanate solution prepared in Example 5 or Comparative Example 5 was added to 100 parts by weight of the above white base to give a one pack acrylic urethane coating material.

This coating material was applied to a zinc phosphate-treated rolled steel sheet which had been preliminarily degreased, with a No. 20 bar coater and cured at 200° to 220° C. for 30 to 40 seconds to give a polyester urethane coating film having a dry film thickness of 20 to 25 μm.

The steel sheets thus coated were examined for adhesion, weatherability and heat resistance and the results are given in Tables 1—1 to 1-4. The polyurethane coatings according to the present invention exhibited improved weatherability, corrosion and heat resistances.

TABLE 1-1

| Results of Application Example 1 | | | | |
|---|---|---|---|---|
| | Ex. 1 | Ex. 2 | Comp. Ex. 1 | Comp Ex. 2 |
| polyurethane | 100 | 100 | 100 | 100 |

TABLE 1-1-continued

| Results of Application Example 1 | | | | |
|---|---|---|---|---|
| | Ex. 1 | Ex. 2 | Comp. Ex. 1 | Comp Ex. 2 |
| resin solution | | | | |
| Typaque CR-90 | 50 | 50 | 50 | 50 |
| thinner | 70 | 70 | 70 | 70 |
| Disparlon 1860 | 0.75 | 0.75 | 0.75 | 0.75 |
| Disparlon 1984-50 | 0.75 | 0.75 | 0.75 | 0.75 |
| Disparlon OX-77 | 0.75 | 0.75 | 0.75 | 0.75 |
| pencil hardness | 2B | 3B | 2B | 3B |
| 60° gloss | 85 | 92 | 84 | 93 |
| adhesion test | 100/100 | 100/100 | 100/100 | 100/100 |
| hot water test | 82 | 74 | 75 | 65 |
| hot test | 1.5 | 7.0 | 1.8 | 9.2 |
| accelerated weathering test | 64 | 72 | 40 | 58 | pencil hardness: determined according to JIS K 5400,
adhesion test: according to JIS K 5400,
hot water test: gloss retention of coating film after immersion in hot water at 80° C. for 2 hours,
heat test: degree of discoloration after heating at 120° C. for 60 hours,
accelerated weathering test: gloss retention after exposure with a dew-panel weather-ometer (mfd. by Suga Test Instrument Co., Ltd.) for 200 hours (dew formation-/exposure = 2 hours/10 hours cycle).

TABLE 1-2

| Results of Application Example 2 | | |
|---|---|---|
| | Ex. 3 | Comp. Ex. 3 |
| ultraviolet-curable coating resin | | |
| pencil hardness | HB | HB |
| 60° gloss | 90 | 91 |
| adhesion test | 60/100 | 40/100 |
| hot water test | 88 | 65 |
| heat test | 1.5 | 1.8 |
| accelerated weathering test | 75 | 65 | pencil hardness: determined according to JIS K 5400,
adhesion test: according to JIS K 5400,
hot water test: gloss retention of coating film after immersion in hot water at 80° C. for 24 hours,
heat test: degree of discoloration after heating at 120° C. for 100 hours,
accelerated weathering test: gloss retention after exposure with a dew-panel weather-ometer (mfd. by Suga Test Instrument Co., Ltd.) for 200 hours (dew formation-/exposure = 2 hours/10 hours cycle).

TABLE 1-3

| Results of Application Example 3 | | |
|---|---|---|
| | Ex. 4 | Comp. Ex. 4 |
| Acrydic A-801 | 100 | 100 |
| Typaque CR-90 | 50 | 50 |
| thinner | 115 | 115 |
| Disparlon A603-20X | 4.8 | 4.8 |
| Disparlon #4200-20 | 2.4 | 2.4 |
| Disparlon L1894-50 | 1.2 | 1.2 |
| Coronate EH | 14.1 | 14.1 |
| TMP adduct | 7.1 | 7.1 |
| pencil hardness | 2H | 2H |
| 60° gloss | 87 | 84 |
| impact test cm | 50 | 50 |
| flexibility test mm | 2 | 2 |
| corrosion test | not corroded | corroded spottily |
| adhesion test | 100/100 | 100/100 |
| heat test | 2.4 | 3.0 |
| accelerated weathering test | 2.0 | 2.6 | pencil hardness: determined according to JIS K 5400,
impact test: according to JIS K 5400,
flexibility test: according to JIS K 5400,
corrosion test: a sample was immersed in warm water at 40° C. for one week and thereafter examined for whether corrosion occurred in cut areas or not,
adhesion test: according to JIS K 5400
heat test: degree of discoloration after heating at 120° C. for 60 hours
accelerated weathering test: gloss retention after exposure with a dew-panel weather-ometer (mfd. by Suga Test Instrument Co., Ltd.) for 200 hours (dew formation-/exposure = 2 hours/10 hours cycle).

TABLE 1-4

Results of Application Example 4

|  | Ex. 5 | Comp. Ex. 5 |
| --- | --- | --- |
| blocked isocyanate | 38.3 | 38.3 |
| Oxyester Z 1439 | 100 | 100 |
| Typaque CR-90 | 56.2 | 56.2 |
| thinner | 24 | 24 |
| Disparlon 1860 | 0.75 | 0.75 |
| Disparlon 1984-50 | 0.75 | 0.75 |
| Disparlon OX-77 | 0.75 | 0.75 |
| 10% Scat 14X | 5.0 | 5.0 |
| pencil hardness | HB | HB |
| 60° gloss | 88 | 86 |
| impact test cm | 50 | 50 |
| T-bending test | 1T | 1T |
| corrosion test | not corroded | corroded spottily |
| adhesion test | 100/100 | 100/100 |
| heat test | 1.4 | 1.8 |
| accelerated weathering test | 1.8 | 2.8 | pencil hardness: determined accordin to JIS K 5400.
impact test: according to JIS K 5400.
corrosion test: a sample was immersed in warm water at 40° C. for one week and thereafter examined for whether corosion occurred in cut areas or not.
adhesion test: according to JIS K 5400.
heat test: degree of discoloration after heating at 120° C. for 60 hours.
accelerated weathering test: gloss retention after exposure with a dew-panel weather-ometer (mfd. by Suga Test Instrument Co., Ltd.) for 200 hours (dew formation-/exposure = 2 hours/10 hours cycle).

EXAMPLE 6

27 mg ($5 \times 10^{-4}$ equivalents per isocyanate group) of acetic acid was added to 100 g of the IPDI prepared in Synthesis Example 4 (hereinafter referred to as the "DMC-process IPDI"). The obtained mixture was dissolved in o-xylene to give a DMC-process IPDI solution having a concentration of 2.0 mol/l.

Separately, n-butanol (reagent of special grade) was dissolved in o-xylene to give a n-butanol solution having a concentration of 2.0 mol/l.

5 ml of the above DMC-process IPDI solution and 10 ml of the above n-butanol solution were accurately weighed with a transfer pipette into a 50 ml Pyrex glass reactor fitted with a condenser and a sampling port, followed by the addition of accurately 5 ml of a solution of diphenyl ether in o-xylene having a concentration of 0.8 mol/l thereto with a transfer pipette.

The obtained mixture was heated on an oil bath kept at 60°±1° C. under sufficient stirring to effect the reaction of the DMC-process IPDI with n butanol to give urethane.

The changes in the residual concentrations of the DMC process IPDI and n-butanol in the reaction mixture with the lapse of time were determined by gas chromatography to monitor the reaction.

After 3 hours from the initiation of the reaction, 67% of the isocyanate groups had been converted into urethane groups and at least 98% of the DMC-process IPDI had reacted.

EXAMPLES 7 TO 11

The DMC-process IPDI prepared in Synthesis Example 4 was examined for reactivity in the formation of urethane in a similar manner to that of Example 6 except that a predetermined amount of a protonic acid listed in Table 1 was added instead of acetic acid.

COMPARATIVE EXAMPLE 6

The DMC process IPDI prepared in Synthesis Example 4 was examined for the reactivity in the formation of urethane in a similar manner to that of Example 6 except that no acetic acid was added.

COMPARATIVE EXAMPLE 7

An IPDI prepared by the phosgene process (hereinafter referred to as the "phosgene-process IPDI") was examined for the reactivity in the formation of urethane in a similar manner to that of Example 6 except that no acetic acid was used.

EXAMPLE 12

111.1 g of the DMC process IPDI prepared in Synthesis Example 4, 32.4 mg ($5 \times 10^{-4}$ equivalents per isocyanate group) of acetic acid and 1000 g of a polytetramethylene glycol having a number-average molecular weight of 2000 (a product of Nippon Polyurethane Industry Co., Ltd., PTG2000) were fed into a reactor fitted with a condenser, a stirrer, a thermometer and a nitrogen inlet tube, and thereafter immediately heated to 120° C. to conduct a reaction.

The reaction was monitored by determining the change in the residual concentration of the DMC-process IPDI in the reaction system with the lapse of time by gas chromatography.

After 3 hours from the point of time when the temperature of the reaction system reached 120° C., a urethane prepolymer having a residual DMC process IPDI concentration of 4.6% by weight and an isocyanate concentration of 3.7% by weight was obtained.

Although the reaction was further continued, no remarkable lowering was observed in the residual DMC-process IPDI concentration or the isocyanate concentration. Accordingly, the necessary reaction time was considered to be 3 hours.

EXAMPLE 13

Another urethane prepolymer was prepared in the same manner as that of Example 12 except that the reaction temperature was 70° C. (not 120° C.).

The reaction was monitored by determining the change in the residual DMC-process IPDI concentration of the reaction system with the lapse of time by gas chromatography. After 9 hours from the point of time when the temperature of the reaction system reached 70° C., a urethane prepolymer having a residual DMC-process IPDI concentration of 3.8% by weight and an isocyanate concentration of 3.7% by weight was obtained.

Although the reaction was further continued, no remarkable lowering was observed in the residual DMC-process IPDI concentration or the isocyanate concentration. Accordingly, the necessary reaction time was considered to be 9 hours.

EXAMPLE 14

Another urethane prepolymer was prepared in the same manner as that of Example 12 except that the polytetramethylene glycol was replaced by a polycaprolactonediol having a number-average molecular weight of 2000 (a product of Daicel Chemical Industries, Ltd., Placcel 220).

The reaction was monitored by determining the change in the residual DMC-process IPDI concentration of the reaction system with the lapse of time by gas chromatography. After 2 hours from the point of time when the temperature of the reaction system reached 120° C., a urethane prepolymer having a residual DMC-process IPDI concentration of 2.6% by weight and an isocyanate concentration of 3.6% by weight was obtained.

Although the reaction was further continued, no remarkable lowering was observed in the residual DMC-process IPDI concentration or the isocyanate concentration. Accordingly, the necessary reaction Time was considered to be 2 hours.

EXAMPLE 15

2000 g of the DMC-process IPDI prepared in Synthesis Example 4 and 0.29 g ($5.4 \times 10^{-4}$ equivalents per isocyanate group) of acetic acid were fed into a reactor fitted with a condenser, a stirrer, a dropping funnel, a thermometer and a nitrogen inlet tube and heated to 50° C.

178.8 g of trimethylolpropane (a product of Mitsubishi Gas Chemical Co., Inc.) molten by heating to 70° C. was dropped into the reactor over a period of 3 hours.

At this point of time, the temperature of the reaction system rose to 70° C.

After the completion of the dropping, the reaction was monitored by determining the change in the isocyanate concentration of the reaction system with the lapse of time by titration. After 3 hours from the completion of the dropping, a urethane prepolymer/monomer mixture having an isocyanate concentration of 29.3% by weight was obtained.

Although the reaction was further continued, no remarkable lowering was observed in the isocyanate concentration. Accordingly, the necessary reaction time was considered to be 6 hours.

COMPARATIVE EXAMPLE 8

111.1 g of the DMC-process IPDI prepared in Synthesis Example 4 and 1000 g of a polytetramethylene glycol having a number average molecular weight of 2000 (a product of Nippon Polyurethane Industry Co., Ltd., PTG2000) were fed into a reactor fitted with a condenser, a stirrer, a thermometer and a nitrogen inlet tube, and thereafter immediately heated to 120° C. to conduct a reaction.

The reaction was monitored by determining the change in the residual DMC-process IPDI concentration of the reaction system with the lapse of time by gas chromatography.

After 6 hours from the point of time when the temperature of the reaction system reached 120° C., a urethane prepolymer having a residual DMC-process IPDI concentration of 4.8% by weight and an isocyanate concentration of 3.7% by weight was obtained.

Although the reaction was further continued, no remarkable lowering was observed in the residual DMC-process IPDI concentration or the isocyanate concentration. Accordingly, the necessary reaction time was considered to be 6 hours.

COMPARATIVE EXAMPLE 9

A reaction was conducted in the same manner as that of Comparative Example 9 except that the reaction temperature was changed to 70° C.

The reaction was monitored by determining the change in the residual DMC-process IPDI concentration of the reaction system with the lapse of time by gas chromatography. After 12 hours from the point of time when the temperature of the reaction system reached 70° C., the residual DMC-process IPDI concentration was 7.8% by weight and the isocyanate concentration was 4.2% by weight That is, no objective urethane prepolymer was obtained.

COMPARATIVE EXAMPLE 10

A urethane prepolymer was prepared in the same manner as that of Comparative Example 9 except that the polytetramethylene glycol was replaced by a polycaprolactonediol having a number-average molecular weight of 2000 (a product of Daicel Chemical Industries, Ltd., Placcel 220).

The reaction was monitored by determining the change in the residual DMC-process IPDI concentration of the reaction system with the lapse of time by gas chromatography. After 4 hours from the point of time when the temperature of the reaction system reached 120° C., a urethane prepolymer having a residual DMC-process IPDI concentration of 3.8% by weight and an isocyanate concentration of 3.8% by weight was obtained.

Although the reaction was further continued, no remarkable lowering was observed in the residual DMC-process IPDI concentration or the isocyanate concentration. Accordingly, the necessary reaction time was considered to be 4 hours.

COMPARATIVE EXAMPLE 11

2000 g of the DMC-process IPDI prepared in Synthesis Example 4 was fed into a reactor fitted with a condenser, a stirrer, a dropping funnel, a thermometer and a nitrogen inlet tube and heated to 50° C.

178.8 g of trimethylolpropane (a product of Mitsubishi Gas Chemical Co., Inc.) molten by heating to 70° C. was dropped into the reactor over a period of 3 hours.

At this point in time, the temperature of the reaction system rose to 70° C.

After the completion of the dropping, the reaction was monitored by determining the change in the isocyanate concentration of the reaction system with the lapse of time by titration. After 9 hours from the completion of the dropping, a urethane prepolymer/monomer mixture having an isocyanate concentration of 31.5% by weight was obtained. This mixture contained a prepolymer having a very high viscosity, so that the molecular weight distribution of the mixture was wider than that of an objective one.

COMPARATIVE EXAMPLE 12

A urethane prepolymer was prepared in the same manner as that of Comparative Example 9 except that an IPDI prepared by the phosgene process (hereinafter referred to as the "phosgene-process IPDI") was used instead of the DMC-process IPDI.

The reaction was monitored by determining the change in the residual DMC-process IPDI of the reaction system with the lapse of time by gas chromatography. After 4 hours from the point of time when the temperature of the reaction system reached 120° C., an objective urethane prepolymer having a residual DMC-process IPDI concentration of 4.2% by weight and an isocyanate concentration of 3.7% by weight was obtained.

Although the reaction was continued further, no remarkable lowering was observed in the residual DMC-process IPDI concentration or the isocyanate concentration. Accordingly, the necessary reaction time was considered to be 4 hours.

TABLE 2

| | Ex. 6 | Ex. 7 | Ex. 8 | Ex. 9 | Ex. 10 | Ex. 11 | Ex. 12 | Ex. 13 | Comp. Ex. 6 | Comp. Ex. 7 |
|---|---|---|---|---|---|---|---|---|---|---|
| isocyanate | DMC IPDI | DMC IPDI | DMC IPDI | DMC IPDI | DMC IPDI | DMC IPDI | DMC IPDI | DMC IPDI | DMC IPDI | DMC IPDI |
| protonic acid | acetic acid | propionic acid | adipic acid | DBS[#1] | phosphoric acid | dimethyl phosphinic acid | acetic acid | acetic acid | — | — |
| amt. mg/100 g | 27.0 | 36.7 | 35.5 | 79.3 | 15.0 | 41.4 | 0.3 | 281 | — | — |
| eq. amt. of proton per NCO group $10^{-4}$ eq. | 5.0 | 5.5 | 5.4 | 2.7 | 1.7 | 5.0 | 0.05 | 52.0 | — | — |
| NCO/OH ratio in reaction | 1.0 | | | | | | | | | |
| reaction temp. | 60 | | | | | | | | | |
| degree of consumption of IPDI after 3 hr % | 98 | 97 | 97 | 99 | 70 | 84 | 76 | >99 | 45 | 87 |
| degree of conversion into urethane after 3 hr % | 67 | 67 | 64 | 84 | 62 | 71 | 51 | 73 | 18 | 54 |

DBS: dodecylbenzenesulfonic acid

EXAMPLE 16

32 mg ($1.12 \times 10^{-4}$ equivalents per isocyanate group) of dibutyltin dilaurate was added to 100 g of the IPDI prepared in Synthesis Example 4 (hereinafter referred to as the "DMC-process IPDI"). The obtained mixture was dissolved in o xylene to give a DMC-process IPDI solution having a concentration of 2.0 mol/l.

Separately, n-butanol (reagent of special grade) was dissolved in o-xylene to give a n-butanol solution having a concentration of 2.0 mol/l.

5 ml of the above DMC-process IPDI solution and 10 ml of the above n-butanol solution were accurately weighed with a transfer pipette into a 50-ml Pyrex glass reactor fitted with a condenser and a sampling port, followed by the accurate addition of 5 ml of a solution of diphenyl ether in o-xylene having a concentration of 0.8 mol/l thereto with a transfer pipette.

The obtained mixture was heated in an oil bath kept at $60° \pm 1°$ C. under sufficient stirring to effect the reaction of the DMC process IPDI with n butanol to form urethane.

The reaction was monitored by determining the changes in the residual concentrations of the DMC-process IPDI and n-butanol in the reaction mixture with the lapse of time by gas chromatography.

After 3 hours from the initiation of the reaction, 67% of the isocyanate groups had been converted into urethane groups and at least 98% of the DMC-process IPDI had reacted.

EXAMPLES 17 TO 21

The DMC-process IPDI prepared in Synthesis Example 4 was examined for the reactivity in the formation of urethane in a similar manner to that of Example 16 except that a predetermined amount of a Lewis acid listed in Table 2 was added instead of the dibutyltin dilaurate.

COMPARATIVE EXAMPLE 13

The DMC process IPDI prepared in Synthesis Example 4 was examined for the reactivity in the formation of urethane in a similar manner to that of Example 16 except that no dibutyltin dilaurate was added.

COMPARATIVE EXAMPLE 14

An IPDI prepared by the phosgene process (hereinafter referred to as the "phosgene-process IPDI") was examined for the reactivity in the formation of urethane in a similar manner to that of Example 16 except that no dibutyltin dilaurate was used.

EXAMPLE 22

111.1 g of the DMC-process IPDI prepared in Synthesis Example 4, 11.1 mg ($3.5 \times 10^{-5}$ equivalents per isocyanate group) of dibutyltin dilaurate and 1000 g of a polytetramethylene glycol having a number-average molecular weight of 2000 (a product of Nippon Polyurethane Industry Co., Ltd., PTG2000) were fed into a reactor fitted with a condenser, a stirrer, a thermometer and a nitrogen inlet tube, and thereafter immediately heated to 120° C. to conduct a reaction.

The reaction was monitored by determining the change in the residual concentration of the DMC-process IPDI in the reaction system with the lapse of time by gas chromatography.

After 3 hours from the point in time when the temperature of the reaction system reached 120° C., a urethane prepolymer having a residual MDC-process IPDI concentration of 3.2% by weight and an isocyanate concentration of 3.6% by weight was obtained.

Although the reaction was continued further, no remarkable lowering was observed in the residual DMC-process IPDI concentration or the isocyanate concentration. Accordingly, the necessary reaction time was considered to be 3 hours.

EXAMPLE 23

A urethane prepolymer was prepared in the same manner as that of Example 7 except that the reaction temperature was changed to 70° C.

The reaction was monitored by determining the change in the residual DMC-process IPDI concentration of the reaction system with the lapse of time by gas chromatography. After 9 hours from the point in time when the temperature of the reaction system reached 70° C., a urethane prepolymer having a residual DMC-process IPDI concentration of 4.6% by weight and an isocyanate concentration of 3.8% by weight was obtained.

Although the reaction was continued further, no remarkable lowering was observed in the residual DMC-process IPDI concentration or the isocyanate concentration. Accordingly, the necessary reaction time was consider to be 9 hours.

EXAMPLE 24

A urethane prepolymer was prepared in the same manner as that of Example 7 except that the polytetramethylene glycol was replaced by a polycaprolactonediol having a number average molecular weight of 2000 (a product of Daicel Chemical Industries, Ltd., Placcel 220).

The reaction was monitored by determining the change in the residual DMC-process IPDI concentration of the reaction system with the lapse of time by gas chromatography. After 2 hours from the point in time when the temperature of the reaction system reached 120° C., a urethane prepolymer having a residual DMC-process IPDI concentration of 4.2% by weight and an isocyanate concentration of 3.8% by weight was obtained.

Although the reaction was continued further, no remarkable lowering was observed in the residual DMC-process IPDI concentration or the isocyanate concentration. Accordingly, the necessary reaction time was considered to be 2 hours.

EXAMPLE 25

2000 g of the DMC process IPDI prepared in Synthesis Example 4 and 0.20 g ($3.5 \times 10^{-5}$ equivalents per isocyanate group) of acetic acid were fed into a reactor fitted with a condenser, a stirrer, a dropping funnel, a thermometer and a nitrogen inlet tube and heated to 50° C.

178.8 g of trimethylolpropane (a product of Mitsubishi Gas Chemical Co., Inc.) molten by heating to 70° C. was dropped into the reactor over a period of 3 hours.

At this point of time, the temperature of the reaction system rose to 70° C.

After the completion of the dropping, the reaction was monitored by determining the change in the isocyanate concentration of the reaction system with the lapse of time by titration. After 3 hours from the completion of the dropping, a urethane prepolymer/monomer mixture having an isocyanate concentration of 29.7% by weight was obtained.

Although the reaction was continued further, no remarkable lowering was observed in the isocyanate concentration. Accordingly, the necessary reaction time was considered to be 6 hours.

COMPARATIVE EXAMPLE 15

111.1 g of the DMC-process IPDI prepared in Synthesis Example 4 and 1000 g of a polytetramethylene glycol having a number-average molecular weight of 2000 (a product of Nippon Polyurethane Industry Co., Ltd., PTG2000) were fed into a reactor fitted with a condenser, a stirrer, a thermometer and a nitrogen inlet tube, and thereafter immediately heated to 120° C. to conduct a reaction.

The reaction was monitored by determining the change in the residual DMC process IPDI concentration of the reaction system with the lapse of time by gas chromatography.

After 6 hours from the point in time when the temperature of the reaction system reached 120° C., a urethane prepolymer having a residual DMC process IPDI concentration of 5.8% by weight and an isocyanate concentration of 4.0% by weight was obtained.

Although the reaction was continued further, no remarkable lowering was observed in the residual DMC-process IPDI concentration or the isocyanate concentration. Accordingly, the necessary reaction time was considered to be 6 hours.

COMPARATIVE EXAMPLE 16

A reaction was conducted in the same manner as that of Comparative Example 4 except that the reaction temperature was changed to 70° C.

The reaction was monitored by determining the change in the residual DMC-process IPDI concentration of the reaction system with the lapse of time by gas chromatography. After 12 hours from the point in time when the temperature of the reaction system reached 70° C., the residual DMC process IPDI concentration was 7.8% by weight and the isocyanate concentration was 4.2% by weight. No objective urethane prepolymer was obtained.

COMPARATIVE EXAMPLE 17

A urethane prepolymer was prepared in the same manner as that of Comparative Example 4 except that the polytetramethylene glycol was replaced by a polycaprolactonediol having a number-average molecular weight of 2000 (a product of Daicel Chemical Industries Ltd., Placcel 220).

The reaction was monitored by determining the change in the residual DMC-process IPDI concentration of the reaction system with the lapse of time by gas chromatography. After 4 hours from the point in time when the temperature of the reaction system reached 120° C., a urethane prepolymer having a residual DMC-process IPDI concentration of 4.0% by weight and an isocyanate concentration of 3.6% by weight was obtained.

After the reaction was continued further, no remarkable lowering was observed in the residual DMC-process IPDI concentration or the isocyanate concentration. Accordingly, the necessary reaction time was considered to be 4 hours.

2000 g of the DMC-process IPDI prepared in Synthesis Example 4 was fed into a reactor fitted with a condenser, stirrer, a dropping funnel, a thermometer and a nitrogen inlet tube and heated to 50° C.

178.8 g of trimethylolpropane (a product of Mitsubishi Gas Chemical Co., Inc.) molten by heating to 70° C. was dropped into the reactor over a period of 3 hours.

At this point in time, the temperature of the reaction system rose to 70° C.

After the completion of the dropping, the reaction was monitored by determining the change in the isocyanate concentration of the reaction system with the lapse of time by titration. After 9 hours from the completion of the dropping, a urethane prepolymer/monomer mixture having an isocyanate concentration of 31.5% by weight was obtained. This mixture contained a prepolymer having a very high viscosity, so that the molecular weight distribution of the mixture was wider than that of an objective one.

COMPARATIVE EXAMPLE 19

A urethane prepolymer was prepared in the same manner as that of Comparative Example 4 except that an IPDI prepared by the phosgene process (hereinafter referred to as the "phosgene-process IPDI") was used instead of the DMC-process IPDI.

The reaction was monitored by determining the change in the residual DMC-process IPDI of the reaction system with the lapse of time by gas chromatography. After 4 hours from the point in time when the temperature of the reaction system reached 120° C., an objective urethane prepolymer having a residual DMC process IPDI concentration of 4.2% by weight and an isocyanate concentration of 3.7% by weight was obtained.

Although the reaction was continued further, no remarkable lowering was observed in the residual DMC-process IPDI concentration or the isocyanate concentration. Accordingly, the necessary reaction time was considered to be 4 hours.

According to the present invention, the reactivity of a diisocyanate prepared from dimethyl carbonate prepared substantially without using phosgene in any step and a diamine can be improved by the addition of a Lewis acid to a level equivalent or superior to that of a diisocyanate prepared by a conventional phosgene process. Further, since the diisocyanate is free from the impurities resulting from phosgene, the polyurethane prepared therefrom exhibits weatherability, corrosion resistance and heat resistance better than those of a conventional polyurethane.

TABLE 3

|   | Ex. 16 | Ex. 17 | Ex. 18 | Ex. 19 | Ex. 20 |
|---|--------|--------|--------|--------|--------|
| A | D process | D process | D process | D process | D process |
| B | DBTDL | MA | TC | BE | AC |
| C | 32.0 | 52.3 | 30.2 | 20.2 | 15.0 |
| D | 1.12 | 6.71 | 3.65 | 3.16 | 2.50 |
| E | 1.0 | 1.0 | 1.0 | 1.0 | 1.0 |
| F | 60 | 60 | 60 | 60 | 60 |
| G | 96 | 93 | 97 | 99 | 68 |
| H | 72 | 68 | 72 | 82 | 42 | description of the abbreviations used in Table 3
A: isocyanate used
B: protonic or Lewis acid added
C: amount of the protonic or Lewis acid added (mg/100 g)
D: equivalent of the protonic or Lewis acid per NCO group ($10^{-4}$ eq.)
E: NCO/OH ratio in urethane formation
F: reaction temperature (°C.)
G: degree of consumption of isocyanate after 3 hr
H: degree of conversion into urethane after 3 hr
D process: dimethyl carbonate-process IPDI
DBTDP: dibutyltin dilaurate
MA: manganese acetate
TC: tin chloride
BE: boron trifluoride diethyl etherate ($BF_3Et_2O$)
AC: aluminum trichloride

TABLE 4

|   | Ex. 21 | Ex. 22 | Ex. 23 | Comp. Ex. 13 | Comp. Ex. 14 |
|---|--------|--------|--------|--------------|--------------|
| A | D process | D process | D process | D process | D process |
| B | DBTDL | DBTDL | DBTDL | — | — |
| C | 32.0 | 52.3 | 30.2 | — | — |
| D | 1.12 | 6.71 | 3.65 | — | — |
| E | 1.0 | 1.0 | 1.0 | 1.0 | 1.0 |
| F | 60 | 60 | 60 | 60 | 60 |
| G | 96 | 93 | 97 | 45 | 87 |
| H | 72 | 68 | 72 | 18 | 54 | description of the abbreviations used in Table 4
A: isocyanate used
B: protonic or Lewis acid added
C: amount of the protonic or Lewis acid added (mg/100 g)
D: equivalent of the protonic or Lewis acid per NCO group ($10^{-4}$ eq.)
E: NCO/OH ratio in urethane formation
F: reaction temperature (°C.)
G: degree of consumption of isocyanate after 3 hr
H: degree of conversion into urethane after 3 hr
D process: dimethyl carbonate-process IPDI
DBTDP: dibutyltin dilaurate
MA: manganese acetate
TC: tin chloride
BE: boron trifluoride diethyl etherate ($BF_3Et_2O$)
AC: aluminum trichloride

We claim:

1. A process for producing polyurethane which comprises preparing a dialkyl carbonate without the use of phosgene, reacting the carbonate with a diamine to give a urethane compound, thermally decomposing the urethane compound to give a diisocyanate and converting the diisocyanate into a polyurethane in the presence of a Lewis acid and/or a protonic acid.

2. A process as set forth in claim 1, wherein said diisocyanate contains chlorine in an amount of 10 ppm or below.

3. A process as set forth in claim 1, wherein said dialkyl carbonate is prepared from carbon monoxide, oxygen and an alkanol.

4. A process as set forth in claim 1, wherein said dialkyl carbonate is prepared by forming propylene carbonate from propylene oxide and carbon dioxide and reacting the formed propylene carbonate with an alkanol.

5. A process as set forth in claim 1, wherein said dialkyl carbonate is prepared from an alkyl nitrite and carbon monoxide.

6. A reaction composition comprising a diisocyanate and a protonic acid and/or a Lewis acid.

7. A coating composition comprising a polyurethane produced by the process as set forth in claim 1 and a pigment.

* * * * *